United States Patent [19]

Kouthoofd et al.

[11] Patent Number: 5,745,307

[45] Date of Patent: Apr. 28, 1998

[54] CLUSTER LENS SYSTEM SUCH AS FOR USE IN PHOTOGRAPHIC PRINTERS

[75] Inventors: Barbara J. Kouthoofd; Lee R. Estelle, both of Rochester, N.Y.

[73] Assignee: Eastman Kodak Company, Rochester, N.Y.

[21] Appl. No.: 851,870

[22] Filed: May 6, 1997

Related U.S. Application Data

[63] Continuation of Ser. No. 577,027, Dec. 22, 1995, abandoned.

[51] Int. Cl.⁶ .......................... G02B 13/02; G02B 13/04; G02B 7/02; G03B 27/44
[52] U.S. Cl. .......................... 359/745; 359/749; 359/822; 355/46
[58] Field of Search .................. 355/46, 133; 359/745, 359/749, 676, 677, 680, 679, 721, 822, 821, 823

[56] References Cited

U.S. PATENT DOCUMENTS

| | | | |
|---|---|---|---|
| Re. 27,527 | 11/1972 | Daugherty | 355/46 |
| 2,612,077 | 9/1952 | Albrecht. | |
| 2,662,446 | 12/1953 | Tronnier. | |
| 2,746,351 | 5/1956 | Tronnier. | |
| 3,038,380 | 6/1962 | Eismann. | |
| 3,169,441 | 2/1965 | Johnson | 88/24 |
| 3,689,149 | 9/1972 | Livingood | 355/46 |
| 4,099,850 | 7/1978 | Matsui. | |
| 4,113,358 | 9/1978 | Nakagawa. | |
| 4,583,845 | 4/1986 | Lucht et al. | 355/46 |
| 4,737,825 | 4/1988 | Davis | 355/54 |
| 4,837,602 | 6/1989 | Tahara | 355/29 |
| 4,931,826 | 6/1990 | Lucht et al. | 355/28 |
| 5,006,886 | 4/1991 | Suzuki | 355/46 |
| 5,099,275 | 3/1992 | Hicks | 355/55 |
| 5,233,474 | 8/1993 | Hirakawa. | |
| 5,257,136 | 10/1993 | Cobb et al.. | |

Primary Examiner—Georgia Y. Epps
Assistant Examiner—Evelyn A. Lester
Attorney, Agent, or Firm—Svetlana Z. Short

[57] ABSTRACT

A cluster lens for imaging a transparency onto an image plane comprises a plurality of lenses which simultaneously have a field of view sufficient to include the transparency. All of the lenses image simultaneously. At least two of these lenses have different magnifications. The lenses are located in a spaced relationship to each other so that that not one of these lenses encroaches upon that section of the field of view of another lens that is used to image the transparency onto the image plane.

9 Claims, 8 Drawing Sheets

CLUSTER LENS SYSTEM SUCH AS FOR USE IN PHOTOGRAPHIC PRINTERS

This is a Continuation of application Ser. No. 08/577,027, filed Dec. 22, 1995, abandoned.

CROSS-REFERENCE TO RELATED APPLICATIONS

This application is related to U.S. Ser. No. 08/577,022, entitled LENS SYSTEM, in the name of Barbara J. Kouthoofd; U.S. Ser. No. 08/577,027, entitled OBJECTIVE LENS SYSTEM, in the name of Barbara J. Kouthoofd; and U.S. Ser. No. 08/580,092, entitled A COMPACT LENS SYSTEM AND A METHOD FOR MAKING SUCH, in the name of Lee R. Estelle, all filed Dec. 22, 1995.

BACKGROUND OF THE INVENTION

1. Field of the Invention

The present invention relates to cluster lens systems, and more particularly to a cluster lens system for simultaneously making different size images.

2. Description of the Prior Art

Various types of high volume photographic printers are known. These printers can be classified into two broad classes: "on-axis" printers and "off-axis" printers.

On-axis printers

In an on-axis printer, the lens system is centered on the optical center line: i.e., the axis connecting the center point of a transparency (such as a photographic negative) and the center point of the print about to be exposed. Thus, the optical axis of the lens and the optical center line are co-linear.

In an on-axis printer, individual prints are made consecutively from the photographic negatives. Only a single lens is required for such printing. On-axis printers are often provided with a plurality of interchangeable lenses with different magnifications in order to make different size images or prints. An example of such on-axis printer is disclosed in U.S. Pat. No. 5,099,275. This photographic printer utilizes a plurality of lenses to provide for different print sizes.

The disadvantage with this type of the printer is that lenses have to be moved on and off the optical path (which lays along the optical center line) any time a different size print is required. Further, only one exposure can be obtained at any single time, and only one print is obtained with each exposure.

Off-axis printers

Off-axis printers are also known. An off-axis printer is a printer that utilizes at least one lens which is not centered on the line connecting the center of the print and the center of the negative. That is, the optical axis of the lens is not co-linear with the optical center line.

An example of a printer that utilizes an off-axis arrangement is disclosed in U.S. Pat. No. 4,837,602 wherein a lens system is pivotally mounted for selectively sliding one of the lenses out of the way and replacing it with another lens in accordance with the printed image size. A lens of given magnification is used singularly (i.e., one lens at a time) and not simultaneously with any other lens.

Cluster lens printers

A cluster printer is a specific kind of off-axis printer. A cluster printer uses a plurality of individual lenses imaging a common object simultaneously to a group of locations at a common image plane. The individual lenses are identical and are symmetrically arranged around the axis connecting the center of the full print format and the center of the transparency (such as the negative). The full print format FPF is the section of photosensitive material containing multiple images created by the lenses of the cluster lens system from one simultaneous exposure of the transparency. Thus, each lens is located "off-axis" with respect to the negative and the print about to be exposed. The advantage of the cluster lens printer is that multiple exposures can be done simultaneously when a cluster lens system is utilized.

U.S. Pat. No. 3,169,441 discloses a printer which includes a lens turret with a lens cluster comprising four identical lenses. The four lenses are positioned in a square pattern for simultaneously making four separate prints (of the same size) from the same negative.

U.S. Pat. No. 4,931,826 also discloses a printer with several cluster lens systems mounted on a carousel. Each cluster lens system consists of a plurality of identical lenses and is capable of printing multiple identical size images upon the paper in a single exposure.

A disadvantage with this type of cluster lens printer is that simultaneous prints of different sizes cannot be produced.

SUMMARY OF THE INVENTION

It is an object of this invention to produce a cluster lens system for making simultaneous exposures producing multiple images of different sizes.

It is another object of this invention to produce an improved printer capable of simultaneously producing multiple prints of different sizes.

According to the invention, the cluster lens system for imaging a transparency onto an image plane comprises a plurality of lenses which simultaneously have a field of view sufficient to include the transparency. All of the lenses image simultaneously. At least two of these lenses have different magnifications. The lenses are located in a spaced relationship to each other so that that not one of these lenses encroaches upon that section of the field of view of another lens that is used to image the transparency onto the image plane.

According to one aspect of the present invention each of the lenses have substantially identical image side numerical apertures.

According to a preferred embodiment of the present invention a photographic printer for imaging transparencies onto a photosensitive material includes a cluster lens system of the present invention.

It is one of the advantages of the present invention that the cluster lens system allows for simultaneous production of multiple prints of different sizes.

BRIEF DESCRIPTION OF THE DRAWINGS

An embodiment of the present invention will now be described, by way of example, with reference to the accompanying drawings, in which:

FIGS. 8A–8I provide aberration curves for the lens illustrated in FIG. 7.

DESCRIPTION OF THE PREFERRED EMBODIMENT

Cluster Lens System

Figure 1:
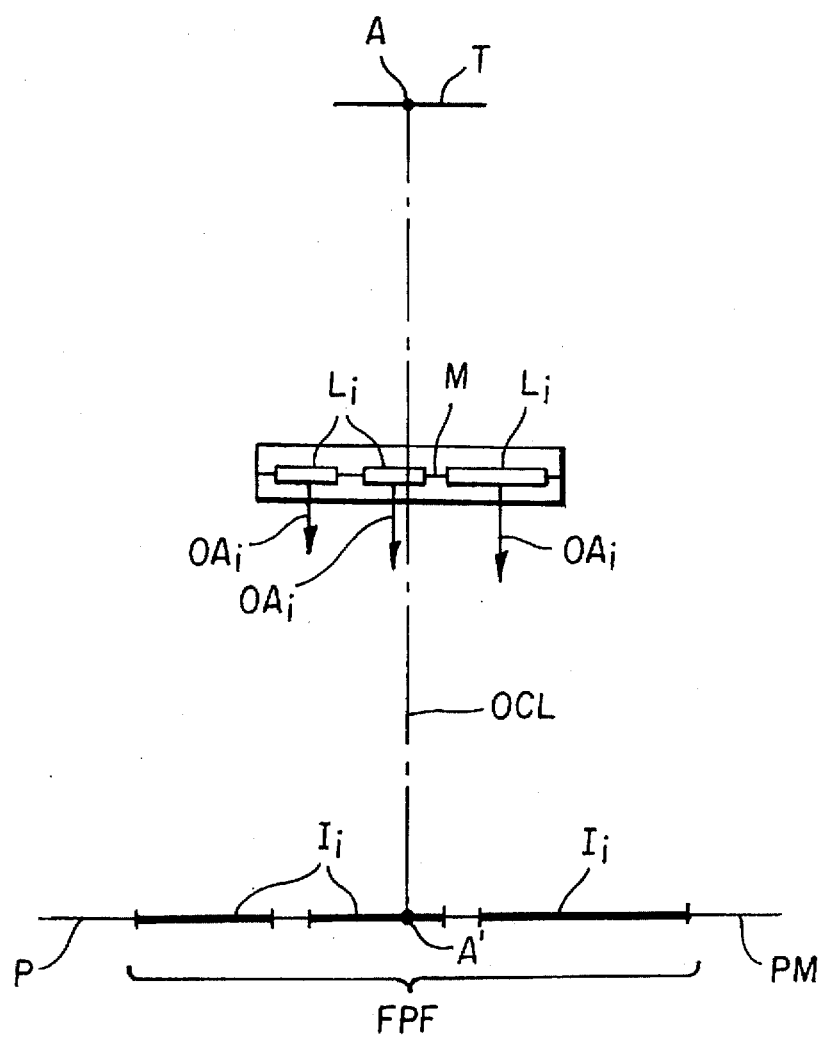
FIG. 1 is a side-view schematic of a cluster lens system according to the present invention.

A cluster lens system of the present invention is illustrated in FIG. 1. Such cluster lens system is very useful for imaging transparencies T, such as negatives, onto a photosensitive material PM, such as a photographic paper P.

A cluster lens system comprises a plurality of individual lenses. These lenses are referred generically to as a lens $L_i$. According to the present invention, at least two of the lenses $L_i$ have different magnifications. Each lens $L_i$ is centered on its individual optical axis $OA_i$. The optical axis $OA_i$ of each of the lenses $L_i$ is perpendicular to the object plane (the plane in which the transparency T is located) and the image plane (the plane in which the photosensitive material is located). Each of the lenses $L_i$ simultaneously exposes (i.e., forms images $I_i$ on) the photosensitive material from the same transparency T. FIG. 1 shows that the transparency T may not be centered around the lens' optical axis $OA_i$. This means that the optical axis $OA_i$ of an individual lens $L_i$ does not have to be co-linear with the optical center line OCL (the line connecting the center of the transparency T with the center of the full print format FPF). The full print format FPF is the section of photosensitive material containing multiple images $I_i$ created by the lenses of the cluster lens system from one simultaneous exposure of the transparency T.

The lenses $L_i$ are located on a mount M in a spaced relationship to each other so that they do not interfere with one another. More specifically, the lenses are mounted between a transparency T and the full print format FPF so that not one of the lenses encroaches upon that section of the field of view of another lens which is used to image the transparency T onto the photosensitive material.

Figure 2:
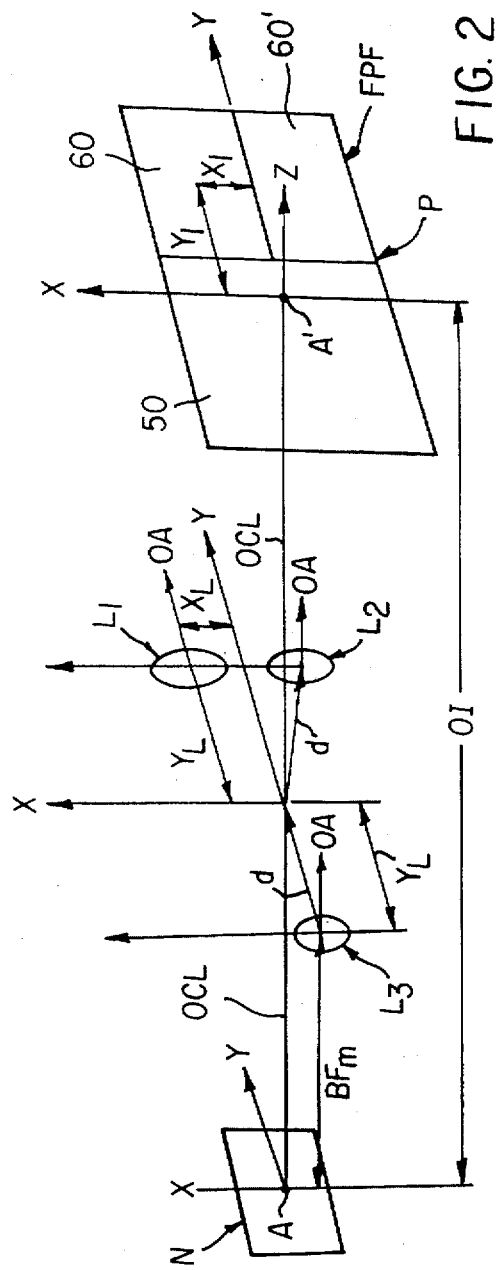
FIG. 2 is a three-dimensional schematic of the cluster lens system comprising "thin lenses" $L_1$, $L_2$, and $L_3$.

With reference to FIG. 2, the "thin" lenses $L_1$–$L_3$ of different magnifications are located at different, although parallel, XY planes. These planes are normal to the optical center line OCL and intersect the optical center line OCL at different locations. The lenses do not have to be symmetrically arranged around the optical center line OCL and are usually located at different distances d from it.

Figure 3:
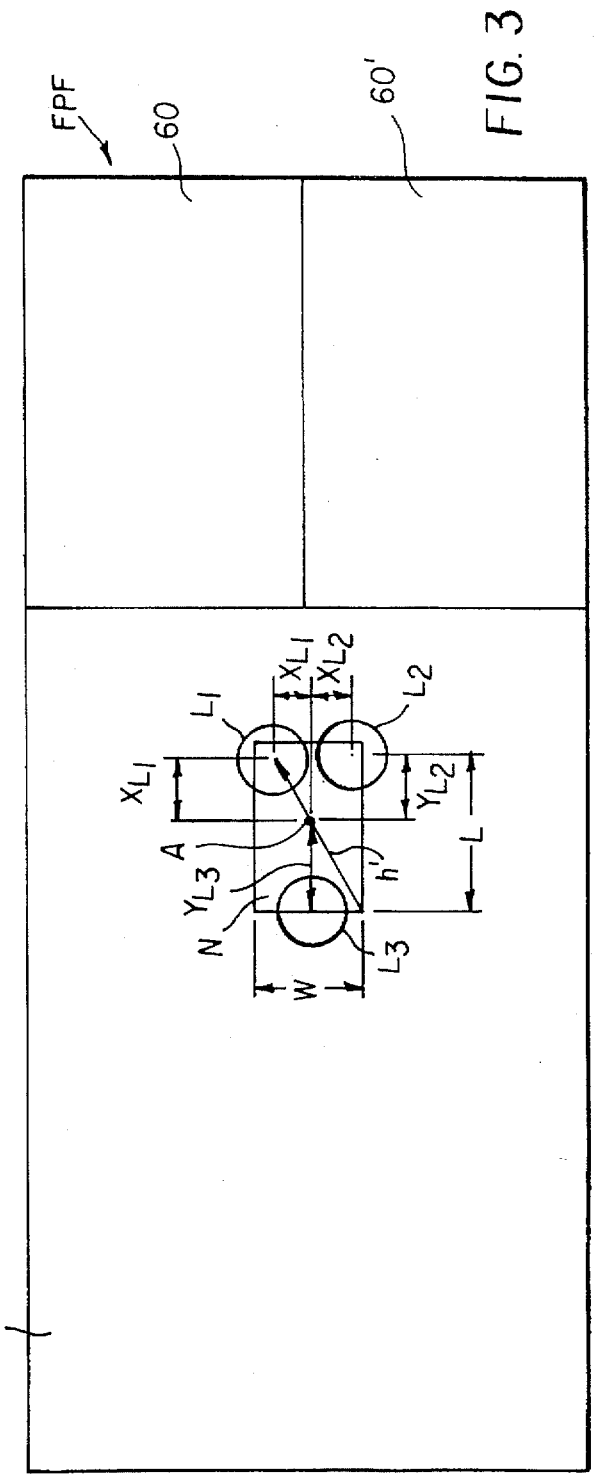
FIG. 3 is a front view of the cluster lens system illustrated in FIGS. 2 and 3.
Figure 4:
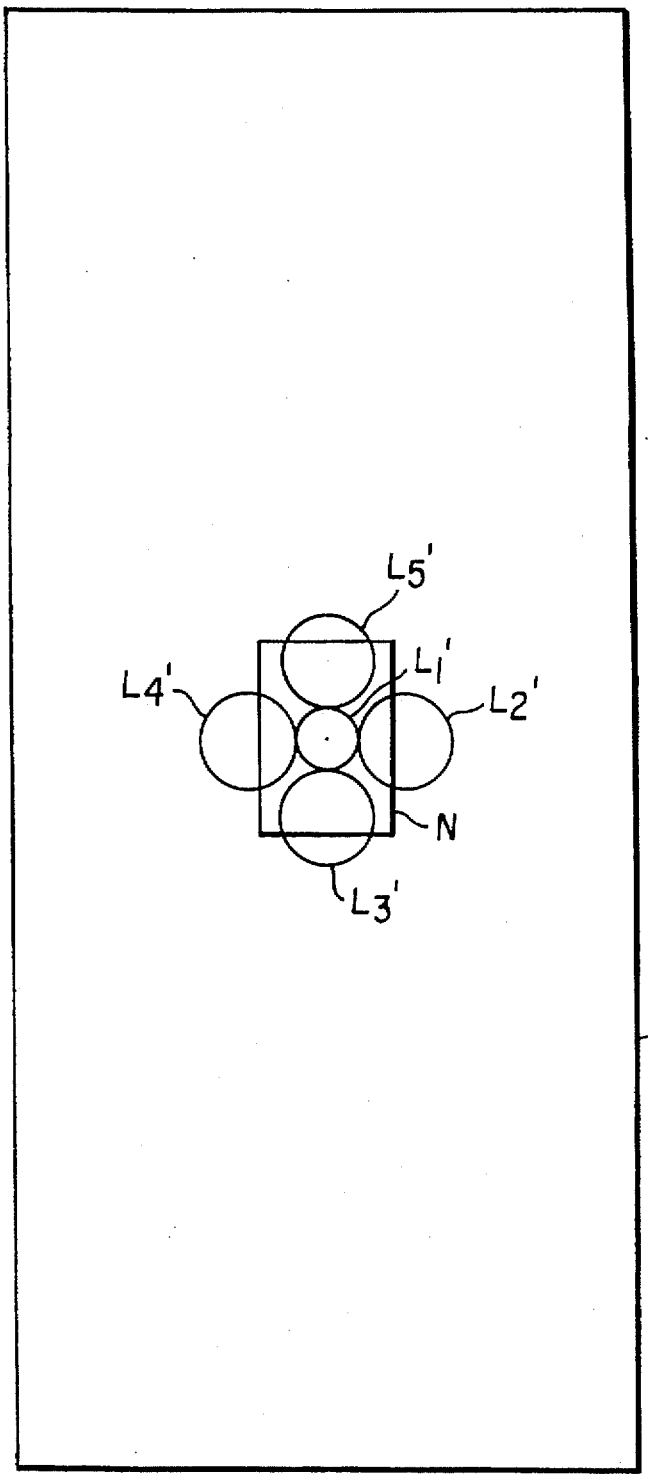
FIG. 4 is a front view of another cluster lens system.

More specifically, a cluster lens system 100 illustrated in FIGS. 2 and 3 comprises three lenses $L_1$–$L_3$ simultaneously imaging a transparency (which in this embodiment is a negative N) onto a photographic paper P. However, a cluster lens system may have as few as two, or more than three lenses. FIGS. 2 and 3 show that none of the lenses $L_1$–$L_3$ have their optical axes co-linear with the optical center line. FIG. 4 illustrates another cluster lens system arrangement. This figure shows that the optical axis of the centrally located lens $L_1'$ is co-linear with the optical center line, while the optical axis of the other lenses $L_2'$–$L_5'$ are not.

A cluster lens system for an off-axis printer simultaneously creates multiple images of different sizes. More specifically, according to the illustrative embodiment shown in FIGS. 2 and 3, the cluster lens system 100 creates a cluster of three adjacent print images (50, 60, 60'). Two images (60, 60') have dimensions of approximately 1.8" by 2.6" (wallet size). These two images are provided by the two identical lenses ($L_1$, $L_2$). The third image is approximately 3.6" by 5.4" and is provided by the lens $L_3$.

The individual lenses $L_1$–$L_3$ for the lens cluster system have been designed to have a field of view sufficient to cover the same negative N. Hence, the negative N is not centered around their optical axes. The apertures and position of the lenses $L_1$–$L_3$ in the space between the object plane (i.e., the plane of the negative N) and image plane (i.e., the plane of the photographic paper P) have been carefully determined (as described below) so that the not one of the lenses $L_1$–$L_3$ encroaches upon that section of the field of view of another lens which is used to image the negative N onto the paper P, yet the numerical aperture at the print side is the same for each of the three lenses, the quality of the off-axis image is excellent, and there is no vignetting.

The steps for proper positioning of the lenses are outlined below.

First, the center coordinates of each lens are determined. FIGS. 2 and 3 illustrate the positioning of the three lenses $L_1$, $L_2$, and $L_3$ with respect to the negative and the full print format FPF.

The center A of the transparency T (in this embodiment it is the negative N) is connected to the center A' of the full print format FPF by the optical center line OCL. The long dimension of the transparency T and the full print format FPF are parallel with each other (Y-axis), and likewise, the short dimension of the transparency T and the full print format FPF are parallel (X-axis). Under these conditions, it is determined that $Y_L = BF_m * Y_1/OI$, and $X_L = BF_m * X_1/OI$.

where $Y_L$ and $X_L$ are the perpendicular distances from the optical center of an individual lens $L_i$ to the optical center line OCL, $BF_m$ is the thin-lens-determined image distance to the transparency T (such as a negative N), $Y_1$ and $X_1$ are the perpendicular distances from the center of the desired print to the optical center line OCL, and OI is the object-to-image distance measured along the perpendicular line that connects the plane occupied by the transparency to the plane occupied by the print. Distances $Y_L$ and $X_L$ determine the (x, y) coordinates of a lens's optical center. Distance $BF_m$ (back focus at magnification m) is equal to the lens system's focal length times (1+m), where m is the magnification of the lens system. The focal length EF is $$EF = \frac{OI}{(m + 1/m + 2)}$$

where usually the OI is given.

A maximum tolerance of 5% yields the requirement:

$0.95(BF_m * Y_1/OI) < Y_L < 1.05(BF_m * Y_1/OI)$.

$0.95(BF_m * X_1/OI) < X_L < 1.05(BF_m * X_1/OI)$.

More specifically, given $BF_m$ distances for lenses $L_1$, $L_2$, and $L_3$, and the object-to-image distance of 575.9 millimeters, the $X_L$ and $Y_L$ distances determining optical center coordinates (x, y) can be calculated for each of the lenses $L_i$ of the cluster lens system. For the two identical lenses $L_1$ and $L_2$, the values for $X_L$ and $Y_L$ are: 22.6 mm $< Y_L <$ 26.2 mm and 7.8 mm $< X_L <$ 8.6 mm. For the third lens $L_3$ the $X_L$ and $Y_L$ values are: 6.4 mm $< Y_L <$ 7.5 mm, and $X_L = 0.0$ mm.

The next two steps are: 1) the calculation of lens diameters and field coverage; and 2) the determination that the lenses do not interfere with each other.

Given the F-number (F/#) requirement for each of the lenses, the clear aperture diameters of the (thin) lenses are easily determined. Since the (x, y) coordinates of the lenses' optical centers are known, the top view drawing of the lenses similar to the one shown in FIG. 3 can be made. This drawing will show whether the lenses interfere with each other and by how much. If no interference or only little interference is shown (i.e., if lenses do not substantially overlap), the actual clear aperture diameters of the lens elements are calculated and the space envelopes required by the lenses are determined. If the actual lenses or their space envelopes do not overlap, then the side view(s) of the actual lenses are drawn with the light rays going through the lenses to make sure that the bundles of rays going through any one lens will not enter any other lens.

More specifically, the field coverage of the lens is determined by the image height h' of the transparency T (FIG. 3). The image height h' is measured along the line that connects the center of the specific lens to the furthest corner of the transparency T. After the lens positions perpendiculars $X_L$ and $Y_L$ to the optical center line OCL are determined, then the image height h' is determined from the following equation:

$$h' = \sqrt{(Y_L + L/2)^2 + (X_L + W/2)^2}$$

where L is the length of the transparency T; and W is the width of the transparency. In this embodiment the transparency is a negative with the length L of 35.28 mm and the width W of 23.75 mm.

For lens $L_1$, $Y_L$=23.83 mm and $X_L$=7.75 mm. Therefore, $Y_L+L/2=23.83+35.28/2=41.47$;

$X_L+W/2=7.75+23.75/2=19.61$; and h'=45.87, where all units of length are measured in millimeters (mm).

The lens coverage (i.e. its full field angle 2θ) can now be computed since tan θ=h'/$BF_m$, where θ is the half field angle and $BF_m$=200 mm. Therefore, tan θ=45.87/$BF_m$=45.87/200= 0.2293 and θ=±12.9°.

The thin lens clear aperture diameter (CLAP) with the stop in contact can be computed based upon the F-number (F/#) requirements. For example, if the F/# at the print must be F/30, then at the negative N it will be F/15.97. The thin lens clear aperture radius is CLAP/2=$BF_m$*0.5/(F/#). Therefore, CLAP/2=200 mm*0.5/15.965 and CLAP=12.53 mm. Of course, the actual lens must have finite thickness and the aperture stop will be spaced some distance away from the lens elements. Therefore, the actual lens element diameters will be different and may be larger than the CLAP value, but at least it can be determined if the lens diameters will not interfere based upon the lens F-number.

Now, the lens is designed with emphasis on reduced diameters. A procedure for designing lenses with small clear aperture diameters is disclosed in U.S. Ser. No. 08/580,092, entitled A COMPACT LENS SYSTEM AND A METHOD FOR MAKING SUCH, in the name of Lee R. Estelle, the disclosure of which is incorporated by reference herein. The final lens placement with respect to the image and object plane is related to the final object distance and image distance of the lens, but the (x, y) coordinates of the lens optical center (determined by $X_L$ and $Y_L$ distances) do not change. At this point (or earlier in the design stage) side views of the lens system are generated to determine ray bundle interference. The individual lenses of the cluster lens system are designed to be telephoto and inverted telephoto to eliminate or reduce any interference while trying to reduce the clear apertures of the lens element so the lenses can be mounted next to each other.

It is preferred that the numerical apertures on the image side (i.e., print side) be identical for all lenses so that each print will be illuminated with the same amount of light. This requirement will result in substantially identically illuminated prints made by the different lenses from the same exposure.

DESCRIPTION OF THE LENSES

The cluster lens system of the present embodiment includes three lenses $L_1$-$L_3$. Since all of the lenses were designed oriented from long to short conjugates, the following text describes the lenses in this orientation (i.e., print to film). However, in the printer the light would flow in the opposite direction, i.e. from the negative towards the print.

Lenses $L_1$-$L_3$ should have the smallest possible clear aperture diameters, yet the relative illumination arriving at the corners of the field of view should be maximized. This requirement means that there should be little or no vignetting present in each of the lenses $L_1$-$L_3$.

Figure 5:
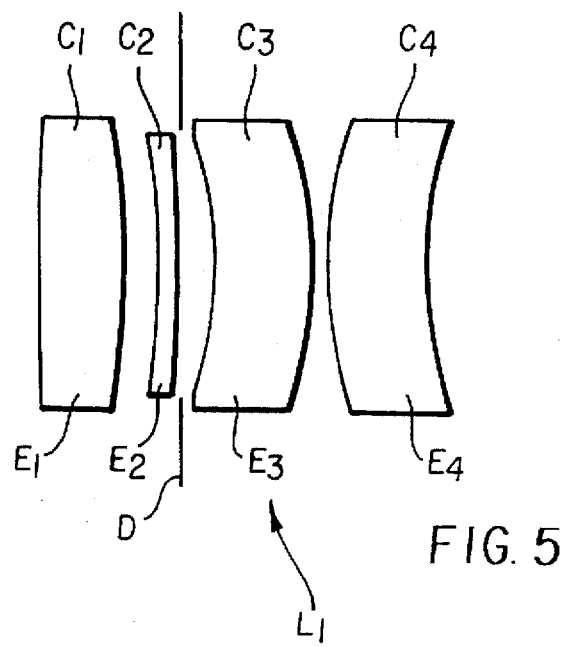
FIG. 5 shows the outline of the lens shown schematically in FIGS. 2 and 3.

The lens $L_1$ (which is identical to the lens $L_2$) of the cluster lens system 100 is illustrated in FIG. 5 and is described below. Its parameters are provided in Table 1. Its aberrations are provided in FIG. 6.

This lens $L_1$ includes four lens elements $E_1$-$E_4$ sequentially arranged from the long to the short conjugate, i.e., from the print side towards the negative side. The front most lens element $E_1$ is a biconvex lens element. The second lens element $E_2$ is a negative meniscus lens element with a concave surface oriented towards the negative. A diaphragm D is located behind this lens element and in front of lens element $E_3$. The third lens element $E_3$ is a meniscus lens element with a concave surface towards the print. The fourth lens element $E_4$ is a meniscus lens element with a concave surface towards the negative. In order to decrease manufacturing costs, the third and the fourth lens elements $E_3$ and $E_4$ were designed to be identical. They have the same radii of curvature, same thickness and are made from the same material. They are simply oriented differently. However, these two lens elements do not have to be identical.

Lenses $L_1$ and $L_2$ have an effective focal length of 129 mm, maximum F-number with no vignetting F/10.5 and cover a full field angle of about 26 degrees. The front vertex to rear vertex length of lenses $L_1$, $L_2$ is about 18 mm, the object distance (i.e., the distance from the print to the lens) is 374 mm and the image distance (i.e., the distance from the lens to the negative) is 184 mm. Lenses $L_1$ and $L_2$ provide 2X magnification (i.e., the print side is about two times larger than the negative).

As stated above, the aberrations of lenses $L_1$ and $L_2$ are provided in FIG. 6.

Figures 6A, 6B, 6C:
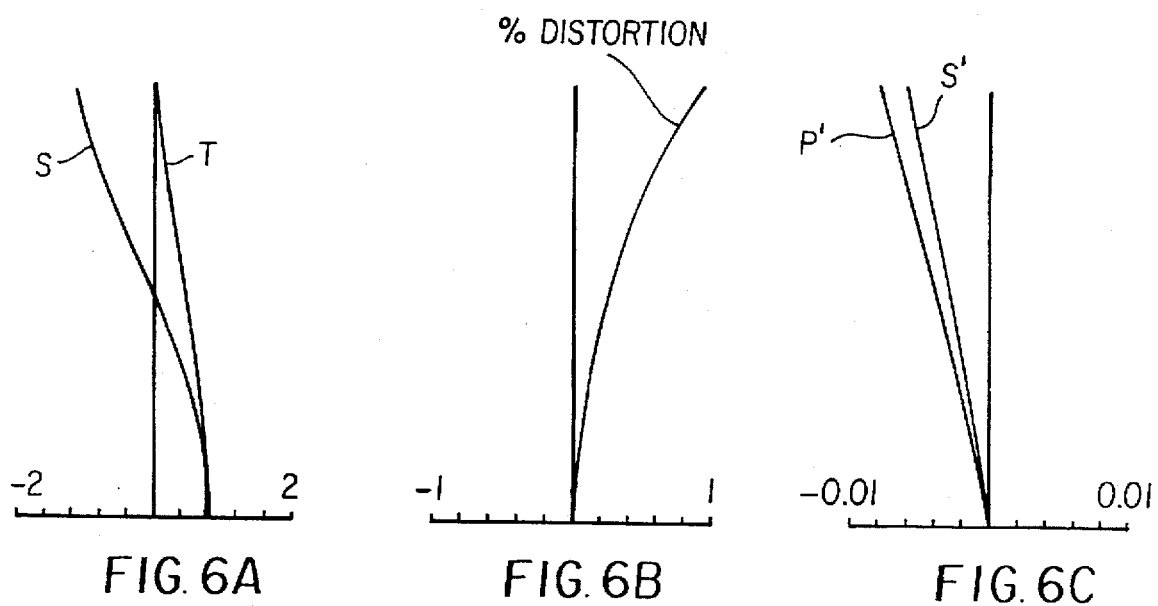
FIGS. 6A–6I provide aberration curves for the lens illustrated in FIG. 5.
Figures 6D, 6E:
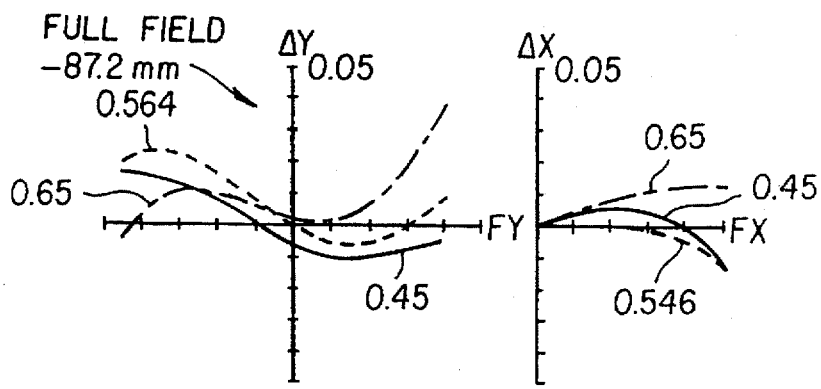
Figures 6F, 6G:
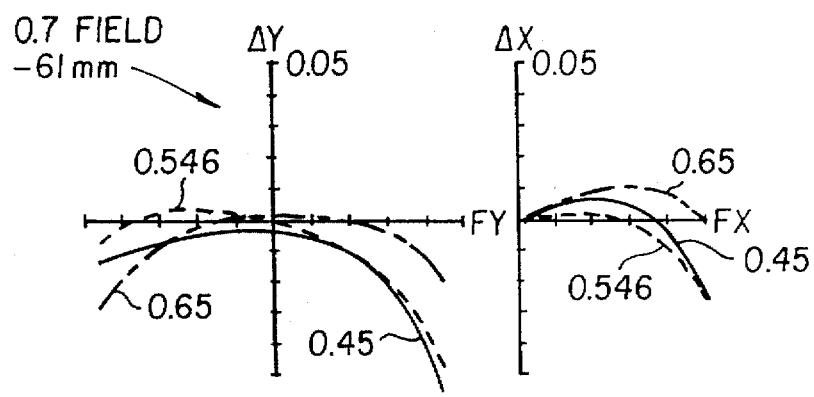
Figures 6H, 6I:
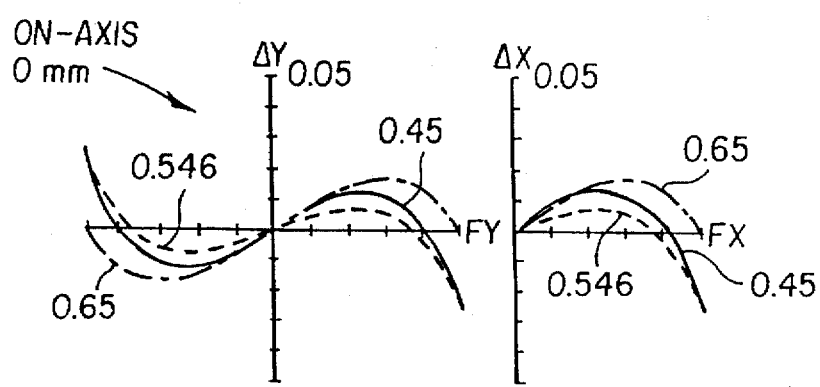

The astigmatism curves with respect to the field height in the sagittal direction S' and in the tangential direction T' in the focal plane (i.e., the plane of the negative) of the lens $L_1$ are shown in FIG. 6A.

The percent distortion in the same plane is shown in FIG. 6B. Lateral color aberration in increments of 0.002 mm for the P" (blue minus red) and for the S" (blue minus green) chromatic characteristics are shown in FIG. 6C. In these curves, blue is 450 nm, green is 546 nm, and red is 650 nm.

The rim-ray curves at maximum field coverage, 0.7 of the field and on-axis are shown in the family of curves shown in FIGS. 6D through 6I. FY is a tangential fan and FX is a sagittal fan corresponding to ray height increments $\Delta Y$ and $\Delta X$, respectively.

Figure 7:
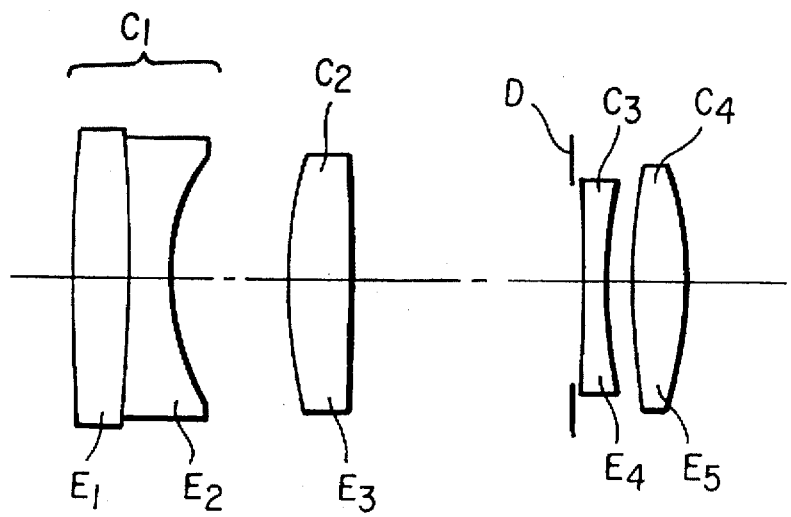
FIG. 7 shows the outline of another lens show schematically in FIGS. 2 and 3.

The lens $L_3$ of the cluster lens system is illustrated in FIG. 7 and is described below.

This lens $L_3$ includes four sequentially arranged lens components $C_1$–$C_4$ comprising five lens elements $E_1$–$E_5$. The lens components $C_1$–$C_4$ are arranged from the print side towards the negative side. The front most lens component $C_1$ is a cemented lens component. This lens component comprises a biconvex lens element $E_1$ and a biconcave negative lens element $E_2$. The second lens component $C_2$ is a biconvex lens element $E_3$. A diaphragm D is located behind this lens element and adjacent to the third lens component $C_3$. The third lens component $C_3$ is a biconcave negative lens element $E_4$. The fourth lens component $C_4$ is a biconvex lens element $E_5$.

The lens $L_3$ has an effective focal length of 87 mm, its maximum F-number with no vignetting is F/6, and the lens covers a full field angle of about 27 degrees. The length of the lens (from the front vertex to the rear vertex) is about 56 mm, its object distance is 364 mm and its image distance is 156 mm. The lens provides about 4X magnification. Its aberrations are provided in FIGS. 8A–8I.

Figures 8A, 8B, 8C:
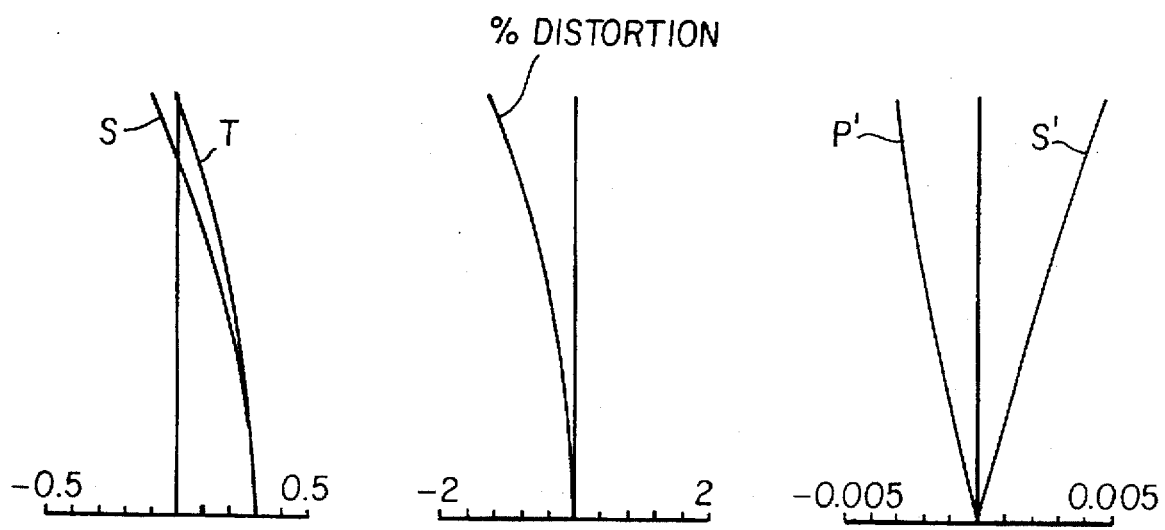
Figure 7:
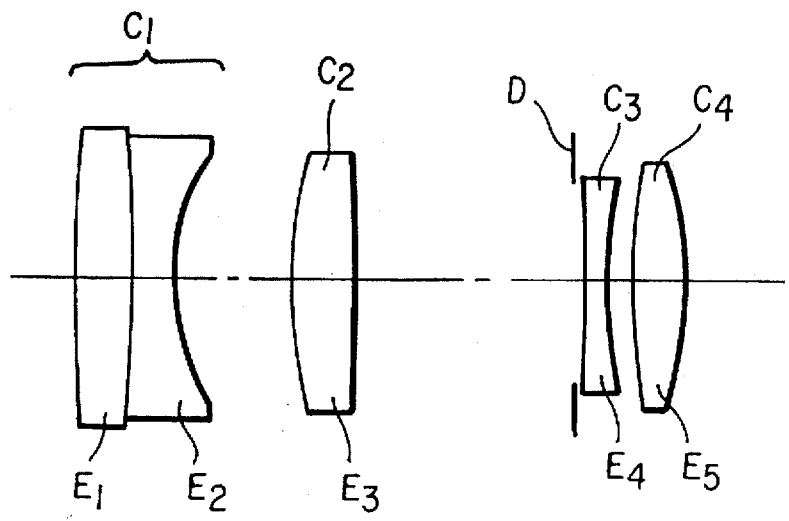
Figures 8A, 8B, 8C:
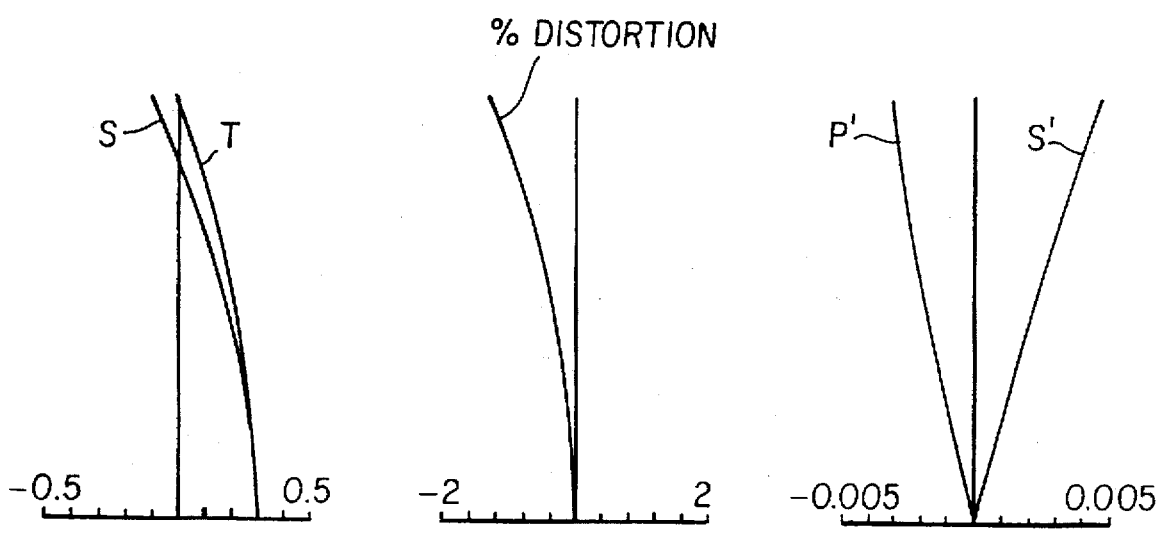

The astigmatism curves with respect to the field height in the sagittal direction S' and in the tangential direction T' in the focal plane of the lens 20 are shown in FIG. 8A. The percent distortion in the same plane is shown in FIG. 8B. Lateral color aberration curves in increments of 0.002 mm for the P" (blue minus red) and for the S" (blue minus green) chromatic characteristics are shown in FIG. 8C. The rim-ray curves at maximum field coverage, 0.7 of the field and on axis are shown in the family of curves of FIGS. 8C through 8I. FY is a tangential fan and FX is a sagittal fan corresponding to ray height increments $\Delta Y$ and $\Delta X$, respectively.

The following are the numerical parameters for the lens $L_1$, $L_2$, and $L_3$, respectively, where lenses $L_1$ and $L_2$ are represented by the parameters of Table 1 and lens $L_3$ is represented by the parameters of Table 2. The radii of curvature, air spaces, thickens of the lens elements are measured in millimeters.

TABLE 1

| Surface | Clear Aperture | Radius | Thickness | Index | V-Number | Special Notes |
|---|---|---|---|---|---|---|
| 1 | 13.80 | 346.194 | 4.163 | 1.691 | 54.7 | LAK9 |
| 2 | 13.16 | −34.7582 | 1.500 | | | |
| 3 | 12.29 | −35.1825 | 1.000 | 1.755 | 27.6 | SF4 |
| 4 | 12.18 | −91.8203 | 0.100 | | | |
| | 12.10 | DIAPHRAGM | 1.678 | | | |
| 5 | 12.05 | −17.7845 | 4.657 | 1.683 | 44.7 | OHARA BAH51 |
| 6 | 13.52 | −20.0010 | 0.599 | | | |
| 7 | 13.78 | 20.0010 | 4.657 | 1.683 | 44.7 | OHARA BAH51 |
| 8 | 13.35 | 17.7845 | | | | |
| | LENS LENGTH | | 18.354 | | PTZ SUM (F/100) = | 0.000411 |

| Image Height | Angular Field | Approx Rel. Illum. (Image) | Max. Aper. With No Vignetting |
|---|---|---|---|
| 15.91 | 4.56 | 0.98 | F/ 10.5 |
| 32.13 | 9.11 | 0.88 | F/ 11.4 |
| 46.11 | 12.90 | 0.77 | F/ 12.3 |

TABLE 1-continued

| Pupil | Location | Diameter |
|---|---|---|
| Ent. | 4.76 | 12.60 |
| Exit | −7.13 | 12.03 |

TABLE 2

| Surface | Clear Aperture | Radius | Thickness | Index | V-Number | Special Notes |
|---|---|---|---|---|---|---|
| 1 | 27.37 | 157.335 | 5.108 | 1.636 | 35.3 | F6 |
| 2 | 25.85 | −157.335 | 4.000 | 1.620 | 60.3 | SK16 |
| 3 | 22.84 | 21.8514 | 10.552 | | | |
| 4 | 23.84 | 45.3478 | 5.725 | 1.575 | 41.5 | LF7 |
| 5 | 23.33 | −467.041 | 20.141 | | | |
| | 18.61 | DIAPHRAGM | 0.923 | | | |
| 6 | 19.00 | −353.897 | 2.000 | 1.755 | 27.6 | SF4 |
| 7 | 19.94 | 50.6343 | 2.456 | | | |
| 8 | 22.16 | 71.3476 | 5.000 | 1.620 | 60.3 | SK16 |
| 9 | 22.99 | −32.7676 | | | | |
| | LENS LENGTH | 55.906 | | | PTZ SUM (F/100) = | 0.001008 |

| Image Height | Angular Field | Approx. Rel. Illum. (Image) | Max. Aper. With No Vignetting |
|---|---|---|---|
| 9.66 | 4.70 | 0.99 | F/ 6.1 |
| 19.30 | 9.39 | 0.98 | F/ 6.1 |
| 27.28 | 13.30 | 0.96 | F/ 6.1 |

| Pupil | Location | Diameter |
|---|---|---|
| Ent. | 28.44 | 13.42 |
| Exit | −9.04 | 21.96 |

It should be noted that while the lens embodiments provided herein do not have aspheric surfaces, it is to be understood that other embodiments of this invention may have one or more aspheric surfaces.

CLUSTER LENS PRINTER

Figure 9:
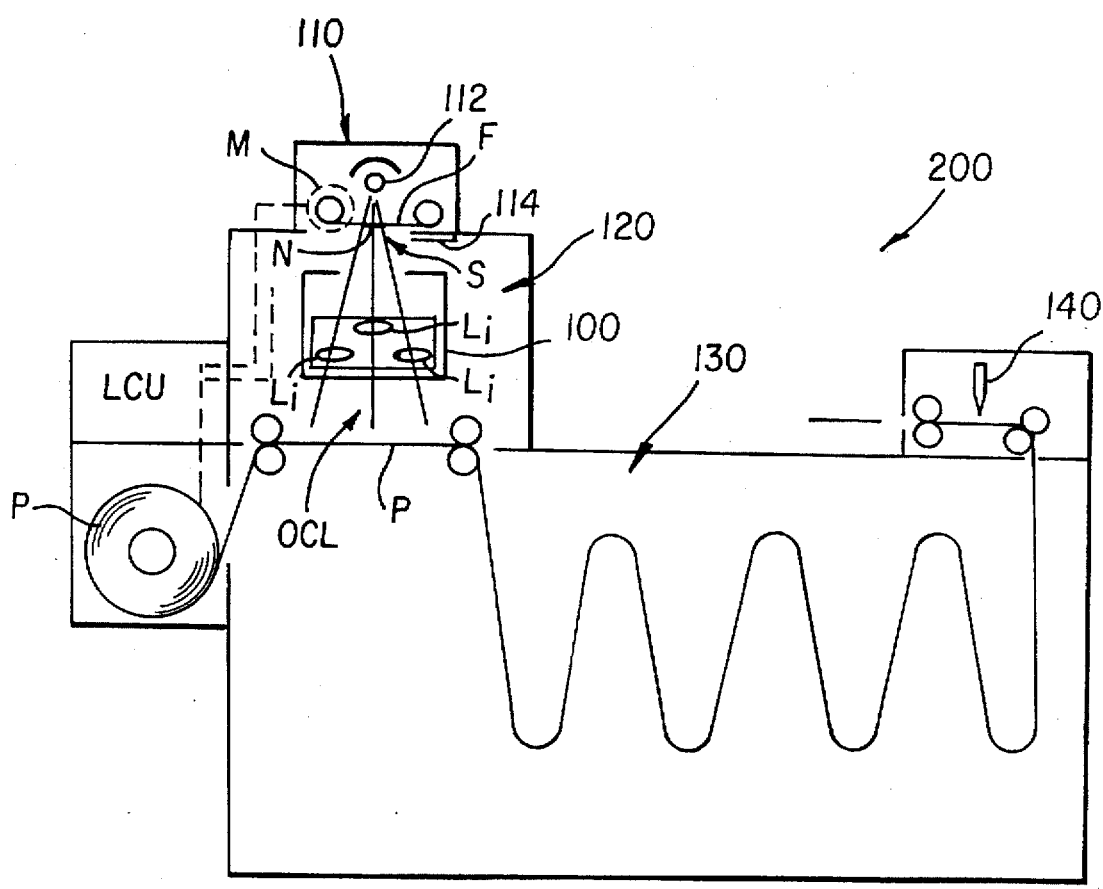
FIG. 9 is a side-view schematic of a printer comprising a cluster lens system of the present invention.

FIG. 9 shows a printer 200 which includes a cluster lens system 100. More specifically, the printer 200 includes a light housing 110, an exposure section 120 and a developing section 130 which is connected to the exposure section 120. The exposure section 120 includes at least one cluster lens system 100, and may include a plurality of cluster lens systems which move in and out of place, as needed. As stated in a previous section of the specification, a cluster lens system 100 comprises a plurality of lenses $L_1$, at least two of which have different magnifications. These lenses are capable of creating a plurality of simultaneous exposures.

A light source 112 and the means for holding and advancing transparencies containing an image are located in a light housing 110.

Alternatively, they may be placed in an exposure section 120. The light housing 110 may include a cupping shutter and a shutter controller which controls the opening and closing of the cupping shutter S. The cupping shutter prevents the unwanted light from the light source 112 from propagating towards the photographic paper.

According to the specific embodiment of the present invention, the light source 112 illuminates a negative N of the film F. The film F is located on the means for holding and advancing transparencies, for example, the film drive and support unit 114 adapted to support and advance photographic film F during the operation of the printer 200.

After passing through the selected negative, the light from the light source 112 is projected through an open shutter S and through a single cluster lens system to expose the corresponding area of photographic paper P with an image from the negative N. The exposure section can also be adapted to expose the photographic paper P with images from other types of transparencies.

The logic and control unit (LCU) is provided as shown in FIG. 9. According to this embodiment, the LCU automatically advances the film F with a synchronous motor M until the appropriate negative N is centered on the optical center line OCL. The LCU also controls the shutter blade of the shutters to control the exposure time and may additionally control the advancement of the print paper P through the print plane (i.e., the plane where the photosensitive print material, such as photographic paper P lies).

A photographic paper support means and the means for advancing the photographic paper may be located in a housing associated with the exposure section 120. Alternatively, they may be located in the development section 130.

The developing section 130 includes means for processing and developing the exposed photographic paper P. In the developing section 130, the exposed paper P is subjected to development, fixing, washing and drying. As a result, latent images on the paper are developed and photographic prints are made. The developed photographic paper P is then transported to the cutter 140. The cutter 140 cuts the paper P to provide the required number of prints.

It should be noted that a printer does not have a developing section. After the paper P is exposed, the paper may be rolled into a roll R and the paper roll may be sent somewhere else for further processing.

It is noted that the term "transparencies" includes, but is not limited to positive slides, individual negatives, and photographic film F containing negatives. It should be understood that although the specific embodiment described above was described with a reference to printing from negatives, this invention contemplates that a printer can print from positive slides, film strips, individual negatives, or other types of transparencies.

The invention has been described in detail with particular reference to a preferred embodiment thereof, but it will be understood that variations and modifications can be effected within the spirit and scope of the invention. It is also understood that the cluster lens system of the present invention can be used in other applications and not only in photographic printing.

What is claimed is:

1. A cluster lens system for imaging a transparency onto an image plane, said cluster lens system comprising:

a plurality of lenses, which simultaneously have a field of view sufficient to include the transparency, said plurality of lenses having substantially identical image side numerical apertures, and wherein at least two of said plurality of lenses have about 2X magnification and another lens has about 4X magnification;

a mount for said plurality of lenses such that all of said lenses image simultaneously and, said plurality of lenses being located in a spaced relationship to each other so that not one of said plurality of lenses encroaches upon a section of the field of view of another lens that is used to image the transparency onto the image plane, and wherein at least one of said plurality of lenses is a telephoto lens and at least one other of said plurality of lenses is an inverse telephoto lens.

2. A cluster lens system according to claim 1 wherein when at least two of said plurality of lenses are modeled as thin lenses, said lenses are located in different planes from each other.

3. A cluster lens system according to claim 1, wherein centers of at least two of said plurality of lenses are located at different distances from a line connecting a center of the transparency with a center of a full print format.

4. A cluster lens system according to claim 2 wherein centers of at least two of said plurality of lenses are located at different distances from the line connecting the center of the transparency with a center of a full print format.

5. A cluster lens system according to claim 1 wherein:

each lens has an optical axis; and said mount holds said plurality of lenses such that the transparency is not centered on any of said optical axes.

6. A photographic printer for making prints from a transparency, said printer comprising:

(i) a light source illuminating the transparency;

(ii) a cluster lens system of claim 1 for exposing a photosensitive material; and (iii) a housing containing said light source and said cluster lens system.

7. A photographic printer for making prints from a transparency, said printer comprising:

(i) a light source illuminating the transparency;

(ii) a cluster lens system of claim 2 for exposing a photosensitive material; and (iii) a housing containing said light source and said cluster lens system.

8. A cluster lens system of claim 1 wherein at least one of said plurality of lenses consists of four lens components arranged in order from a first side to a second side (a) a first, negative power lens component with a concave surface oriented towards the second side, said lens component comprising a positive power lens element cemented to a negative power lens element;

(b) a second, positive power lens component, said second lens component being a biconvex lens element;

(c) a third, negative power lens component with a concave surface oriented towards the second side; and (d) a fourth, positive power lens component, said fourth lens component being a biconvex lens element, said lens components cooperating with one another to produce back focus distance greater than the focal length.

9. A cluster lens system according to claim 8 having a first air space between said first and said second lens component and a second air space between said second and said third lens component wherein said first airspace is smaller than said second airspace.

* * * * *